United States Patent
Oshiro et al.

(10) Patent No.: US 9,229,212 B2
(45) Date of Patent: Jan. 5, 2016

(54) IMAGE-ACQUISITION DEVICE

(75) Inventors: Masafumi Oshiro, Hamamatsu (JP);
Yuichi Toyoda, Hamamatsu (JP);
Yoshinori Hashimoto, Hamamatsu (JP)

(73) Assignee: HAMAMATSU PHOTONICS K.K.,
Hamamatsu-shi, Shizuoka (JP)

( * ) Notice: Subject to any disclaimer, the term of this patent is extended or adjusted under 35 U.S.C. 154(b) by 951 days.

(21) Appl. No.: 13/395,175

(22) PCT Filed: Jul. 12, 2010

(86) PCT No.: PCT/JP2010/061779
§ 371 (c)(1),
(2), (4) Date: Mar. 9, 2012

(87) PCT Pub. No.: WO2011/030614
PCT Pub. Date: Mar. 17, 2011

(65) Prior Publication Data
US 2012/0176489 A1    Jul. 12, 2012

(30) Foreign Application Priority Data
Sep. 11, 2009 (JP) ................ 2009-210739

(51) Int. Cl.
H04N 7/18    (2006.01)
G02B 21/36   (2006.01)
G02B 21/00   (2006.01)
G02B 27/00   (2006.01)

(52) U.S. Cl.
CPC ............ G02B 21/367 (2013.01); G02B 21/002 (2013.01); G02B 27/0075 (2013.01)

(58) Field of Classification Search
CPC . G02B 21/002; G02B 27/0075; G02B 21/367
USPC .................................................... 348/79, 80
See application file for complete search history.

(56) References Cited

U.S. PATENT DOCUMENTS 7,444,014 B2 * 10/2008 Dresser et al. ................ 382/154
2005/0219688 A1 * 10/2005 Kawano et al. ............... 359/385
(Continued)

FOREIGN PATENT DOCUMENTS

| JP | 3191928 | 5/2001 |
|----|---------|--------|
| JP | 2004-507743 | 3/2004 |
| JP | 2006-518050 | 8/2006 |

(Continued)

Primary Examiner — William C Vaughn, Jr.
Assistant Examiner — Naod Belai
(74) Attorney, Agent, or Firm — Drinker Biddle & Reath LLP

(57) ABSTRACT

An image acquisition apparatus 1A includes a sample stage 10 for placing a sample S thereon, an image pickup device 20 capable of acquiring a two-dimensional image and TDI driving, an image pickup optical system 30 including an objective lens 32, a scanning unit for acquiring an observation image while scanning the sample S by the image pickup device 20 and the image pickup optical system 30, and a focus oscillation control device 40 for controlling oscillation of a focus in the sample S so that an image pickup focus in the sample S oscillates at an oscillation frequency fs in an optical axis direction. The focus oscillation control device 40 sets the oscillation frequency fs so that the oscillation frequency fs substantially coincides with Ns times (Ns is an integer not less than 1) the basic frequency, which is a reciprocal 1/Ti of an image pickup period Ti of TDI driving in the image pickup device 20. Thus, an image acquisition apparatus capable of efficiently acquiring an observation image with focus extended can be realized.

8 Claims, 12 Drawing Sheets

(56) References Cited

U.S. PATENT DOCUMENTS

2007/0146873 A1* 6/2007 Ortyn et al. .................. 359/386
2009/0225199 A1* 9/2009 Ferren ..................... 348/240.99

FOREIGN PATENT DOCUMENTS

| JP | 2007-233098 | 9/2007 |
| JP | 2008-51773 | 3/2008 |

* cited by examiner (a)

(b)

(c)

(a)

(b)

(c)

(d)

(a)

(b)

(a)

(b)

(a)

(b)

IMAGE-ACQUISITION DEVICE

TECHNICAL FIELD

The present invention relates to an image acquisition apparatus for acquiring an observation image of a sample.

BACKGROUND ART

Recently, in the field of pathology, etc., there are known virtual microscopes which can be operated as if an operator observes a sample through a real microscope in a virtual space of a personal computer or the like. Sample data to be handled in such a virtual microscope is based on image data of a sample acquired in advance by using a real microscope at high resolution.

For realizing image operation in the virtual microscope, it is demanded that an image acquisition apparatus which acquires image data (virtual slides) of a sample to be thus used in a virtual microscope acquires an image of a sample at sufficiently high resolution. For such image acquisition with high resolution, for example, a method for acquiring an observation image for a whole sample by imaging while scanning the sample two-dimensionally by an image pickup device has been used (for example, refer to Patent Documents 1 and 2). Thus, acquiring an image while scanning a sample two-dimensionally makes it easy to acquire a high-resolution image of the whole sample in a short time.

Citation List

Patent Literature

Patent Document 1: Japanese Patent Application Laid-Open No. 2007-233098
Patent Document 2: Japanese Patent Application Laid-Open No. 2008-51773
Patent Document 3: U.S. Pat. No. 7,444,014
Patent Document 4: Japanese Patent Publication No. 3191928
Patent Document 5: Japanese Translation of PCT International Application No. 2004-507743

SUMMARY OF INVENTION

Technical Problem

In acquisition of an observation image of a sample as described above, a pathological sample in a pathological diagnosis is a thin section, but in the case of cytological diagnosis or the like, its sample is thick. For acquisition of an observation image of such a thick sample, acquisition of information in a z-axis direction (depth direction of the sample) along an optical axis of the microscope is demanded in some cases. In response to such a demand, conventionally, a method (Z-stack) for acquiring a plurality of observation images different in position in the depth direction by performing scanning of a sample on a plurality of focal planes with the focus position varied in the z-axis direction has been used. According to such a method, even with a virtual slide, a sample observation can be performed with the focus position varied.

On the other hand, in terms of a sample such as a pathological sample to serve as an observation object, there has been provided a method called Extended Depth of Focus for creating a single observation image with a depth of focus extended (for example, refer to Patent Documents 3 to 5). An extended focus image acquired by such a method includes concentration of information in the z-axis direction, and is not suitable for pathological diagnosis in some cases, but such a function is effective in cases of counting points distributed in the z-axis direction in FISH, CISH, and the like, and analyzing an image by a computer.

In terms also of a sample with an uneven thickness, a thin sample which is difficult to be brought into focus, and the like, by applying thereto the function of an extended focus image as in the above, sample scanning with fewer failures can be realized in practical use. In acquisition of a plurality of observation images by the Z-stack, the file size increases in proportion to the number of images stacked, but in acquisition of a focus extended image by the Extended Depth of Focus, the file size does not increase.

As a method for acquiring an extended focus image, for example, a method for creating by an arithmetic operation an extended focus image from a plurality of observation images in the Z-stack can be considered. However, in this method, it requires a long time to acquire a plurality of Z-stack images to form a base, and the file size therefor also increases as described above. Moreover, there are several problems in practical use such that it takes time for positional deviation correction of each of the images different in focus position and an arithmetic operation, and particularly, in large-capacity images such as virtual slides, it takes considerable time to process those.

Moreover, as another method for acquiring an extended focus image, there is provided a method for acquiring an observation image with a focus extended by varying the focus position during imaging of a sample with the sample standing still. However, whether it is possible, also in such a method, as with the foregoing virtual slide, when acquiring an observation image while scanning a sample by an image pickup device, to perform image acquisition while varying the focus position simultaneously with scanning, and its method have not been sufficiently studied so far.

The present invention has been made in order to solve the problems described above, and an object thereof is to provide an image acquisition apparatus capable of efficiently acquiring an observation image with a focus extended even in a configuration for acquiring a high-resolution image of a sample while scanning the sample by an image pickup device.

Solution to Problem

In order to achieve the above-described object, an image acquisition apparatus according to the present invention includes (1) a sample stage for placing a sample as an image pickup object thereon, (2) an image pickup device capable of acquiring a two-dimensional image whose longitudinal direction is along a first direction and TDI driving, (3) an image pickup optical system including an objective lens disposed between the sample stage and the image pickup device, (4) scanning means for acquiring an observation image by the image pickup device and the image pickup optical system while scanning the sample in a second direction different from the first direction, and (5) focus oscillation control means for controlling oscillation of a focus in the sample so that an image pickup focus in the sample to be set by the image pickup optical system oscillates at a predetermined oscillation frequency fs in an optical axis direction with respect to the sample, in which (6) the focus oscillation control means sets the oscillation frequency fs, with respect to an image pickup period Ti that is determined by a charge transfer rate and the number of transfer pixels in TDI driving in the image pickup device, so that the oscillation frequency fs coincides within a predetermined range with Ns times (Ns is an integer not less than 1) the basic frequency, the basic frequency being a reciprocal 1/Ti of the image pickup period.

In the above-described image acquisition apparatus, an image pickup device capable of acquiring a two-dimensional image and TDI (Time Delay and Integration) driving is used as the image pickup device for scanning the sample. TDI driving is a driving method, by synchronizing the timing of vertical transfer of a charge generated in each pixel and the movement timing of an image pickup object (image pickup object portion) in the sample with each other, for performing integrating exposure corresponding to the number of pixel stages in the vertical direction (direction perpendicular to the first direction) in a two-dimensional pixel structure. By using this image pickup device, an image can be acquired while a sample is scanned, so that highly sensitive image acquisition can be performed in a short time for the sample.

The apparatus acquires an observation image while scanning the sample in the second direction (preferably, a direction perpendicular to the first direction) by the image pickup device and the image pickup optical system including the objective lens, and performs image acquisition while oscillating its focus of image pickup at the oscillation frequency fs in the optical axis direction (z-axis direction) with respect to the sample. Thus, by using not a line sensor but a TDI sensor in scanning of a sample and acquiring an image while oscillating the focus, an observation image of the sample with a focus extended is obtained in a short time.

Further, unlike a common two-dimensional image pickup device, in the TDI driving image pickup device, the image pickup period Ti for each image pickup object of the sample is determined by a product of the charge transfer rate per one pixel synchronized with the movement timing of the image pickup object, and the number of transfer pixels (number of pixel stages in the vertical direction). For this image pickup period Ti in TDI driving, in the above-described image acquisition apparatus, focus oscillation with respect to the sample is controlled so that the oscillation frequency fs substantially coincides with Ns times the basic frequency, which is a reciprocal 1/Ti of the image pickup period. Accordingly, TDI driving in the image pickup device and oscillation of the focus can be synchronized with each other to acquire an extended focus image of the sample efficiently and reliably.

Advantageous Effects of Invention

According to the image acquisition apparatus of the present invention, an image pickup device capable of acquiring a two-dimensional image and TDI driving is used as the image pickup device for scanning a sample, and by performing, during scanning of the sample by the image pickup device and the image pickup optical system, image acquisition while oscillating its image pickup focus at the oscillation frequency fs in the optical axis direction with respect to the sample, and controlling focus oscillation in the sample with respect to the image pickup period Ti in TDI driving so that the oscillation frequency fs coincides within a predetermined range with Ns times the basic frequency, the basic frequency being a reciprocal 1/Ti of the image pickup period, TDI driving and focus oscillation can be synchronized with each other to acquire a focus extended image of the sample efficiently and in a short time.

DESCRIPTION OF EMBODIMENTS

Figure 1:
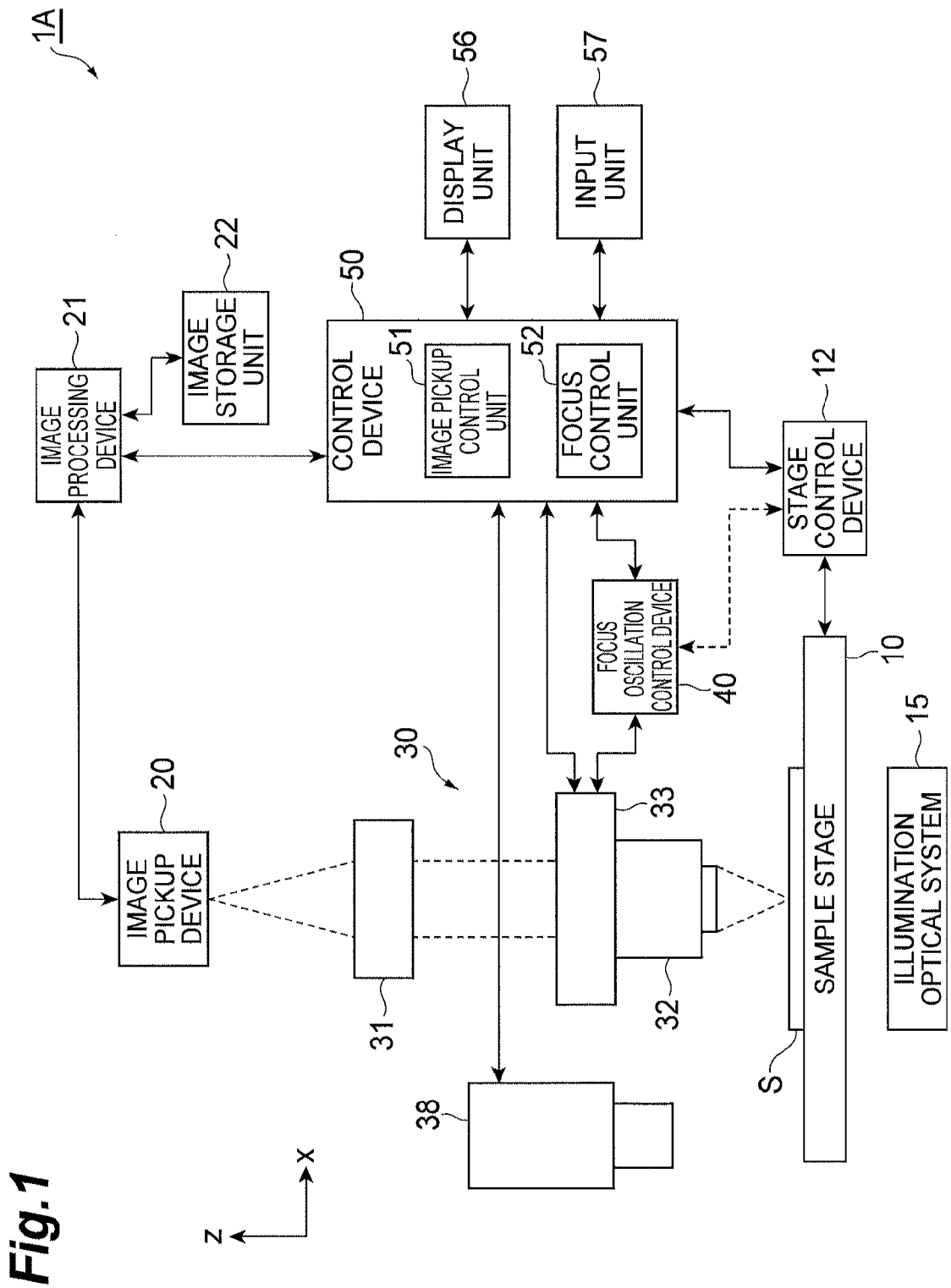
FIG. 1 is a block diagram showing a configuration of an embodiment of an image acquisition apparatus.

Hereinafter, preferred embodiments of an image acquisition apparatus according to the present invention will be described in detail along with the drawings. In the description of the drawings, the same components are denoted by the same reference symbols, and overlapping description will be omitted. The dimensional ratios in the drawings are not always the same as those in the description.

FIG. 1 is a block diagram showing a configuration of an embodiment of an image acquisition apparatus according to the present invention. This image acquisition apparatus 1A is configured as a transmission type microscope apparatus to be used for acquisition of observation images of a sample S. The sample S to serve as an image pickup object is, for example, a biological sample, and is placed on a sample stage 10. In the following description, as shown in FIG. 1 and FIG. 2, the optical axis direction of the image acquisition apparatus 1A is referred to as a z-axis direction, the longitudinal direction of a two-dimensional pixel structure in an image pickup device 20 perpendicular to the z-axis direction is referred to as an x-axis direction (first direction), and the direction perpendicular to both of the z-axis direction and the x-axis direction is referred to as a y-axis direction (second direction).

The sample stage 10 is formed of an XY stage movable in the x-axis direction and y-axis direction (horizontal direction), and by driving this XY stage 10 within the xy plane, setting and adjustment of an image pickup position for the sample S and scanning of the sample S can be performed. The driving of the sample stage 10 is controlled by a stage control device 12. An illumination optical system 15 is provided below the sample stage 10. The illumination optical system 15 includes, for example, an illumination light source that supplies the sample S with light for generating an optical image of an image pickup object and a guiding optical system that makes light from the illumination light source incident on the sample S.

For the sample S on the stage 10 to be irradiated with light from the illumination optical system 15, the image pickup device 20 is installed at a predetermined position above the stage 10. As this image pickup device 20, an image pickup device capable of acquiring a two-dimensional image whose longitudinal direction is along the x-axis direction and TDI driving is used. For this image pickup device 20, an image processing device 21 that performs a necessary processing for image data acquired by the image pickup device 20 and an image storage unit 22 that stores image data as appropriate acquired by the image pickup device 20 or processed by the image processing device 21 are provided.

Figure 2:
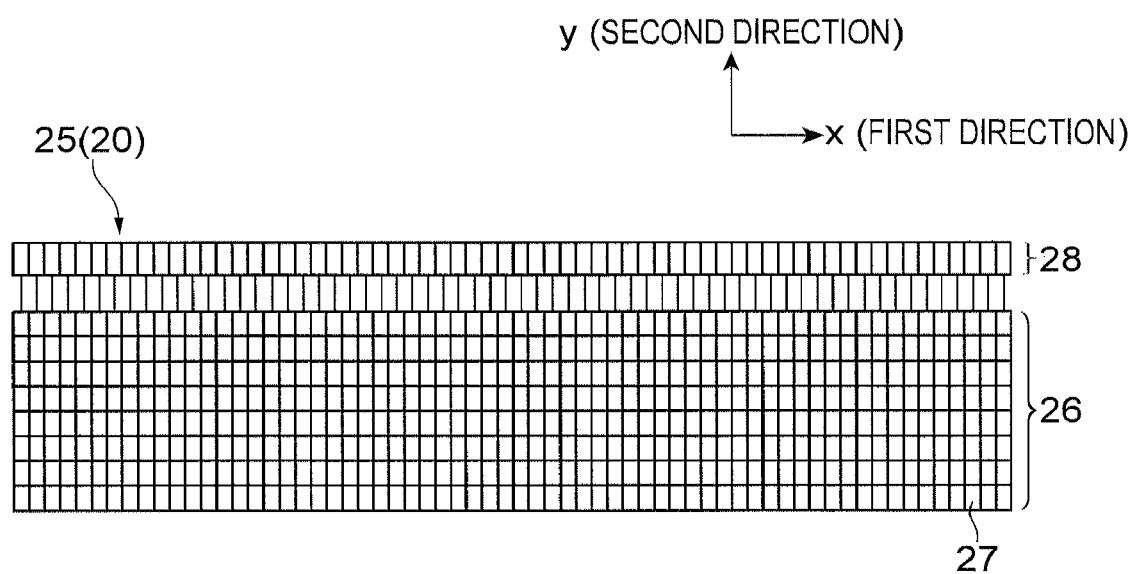
FIG. 2 is a plan view showing an example of a pixel structure of a two-dimensional sensor in an image pickup device.

FIG. 2 is a plan view showing an example of a pixel structure of a two-dimensional sensor in the image pickup device 20. As the image pickup device 20 of this image acquisition apparatus 1A, a CCD camera including a two-dimensional CCD sensor capable of TDI driving is preferably used. FIG. 2 shows a pixel structure in the two-dimensional CCD sensor 25 of the image pickup device 20.

The two-dimensional CCD sensor 25 in this configuration example includes a photodetection section 26 and a charge transfer section 28. The photodetection section 26 includes a plurality of pixels 27 arranged in a two-dimensional array form and each having a photoelectric conversion function, and is configured so as to output as image data a charge generated according to the amount of incident light in each pixel 27. The photodetection section 26 is, in terms of the x-axis and y-axis being arrangement axes of its pixels, configured so as to have its longitudinal direction along the x-axis direction, and accordingly, acquisition of a two-dimensional image whose longitudinal direction is along the x-axis direction is enabled. FIG. 2 schematically shows a pixel structure when the number of pixels in the x-axis direction (horizontal transfer direction) is set to 64 pixels, and the number of pixels in the y-axis direction (vertical transfer direction) is set to 8 pixels.

For this photodetection section 26, the charge transfer section 28 is provided along the x-axis direction above the same in the figure. This charge transfer section 28 is a horizontal shift register that transfers in the horizontal direction charges output from a plurality of vertical shift registers that compose the photodetection section 26 and input in parallel, and outputs the charges from its output end. The operation of the image pickup device 20 including TDI driving in the CCD sensor 25 will be described later specifically.

Between the sample stage 10 and the image pickup device 20, an image pickup optical system 30 that guides an optical image of the sample S is provided. In this embodiment, the image pickup optical system 30 is configured with a tube lens 31 and an objective lens 32. A focus adjusting mechanism 33 is provided for the objective lens 32, and by this focus adjusting mechanism 33 varying the position of the objective lens 32 in the z-axis direction, the focus position for the sample S is adjusted.

For the image pickup device 20 and the image pickup optical system 30, the sample stage 10 functions as scanning means for acquiring an observation image of the sample S while scanning the sample S in the y-axis direction (second direction different from the first direction) by the image pickup device 20 and the image pickup optical system 30. That is, by performing imaging of the sample S while moving the sample stage 10 in the y-axis direction, a high-resolution observation image of the sample is acquired while the sample S is scanned by the image pickup device 20. By performing such scanning of the sample S a plurality of times with the scanning position in the x-axis direction changed, and combining a plurality of acquired images, an observation image of the sample S at high resolution and in a wide range can be acquired.

In this embodiment, for the above-described image pickup system including the image pickup device 20 and the image pickup optical system 30, a macro image pickup device 38 is further provided as a separate image pickup system. This macro image pickup device 38 is used, prior to acquisition of a high-resolution image (micro image) by the image pickup device 20, when acquiring a low-resolution image (macro image) to be used for, for example, grasping a whole image of the sample S. The sample S is moved between an image pickup position corresponding to the image pickup device 20 and an image pickup position corresponding to the macro image pickup device 38 by, for example, driving the sample stage 10.

Further, for the focus adjusting mechanism 33 of the objective lens 32, a focus oscillation control device 40 is provided. This focus oscillation control device 40 is focus oscillation control means that controls oscillation of a focus in the sample S so that an image pickup focus in the sample S set by the image pickup optical system 30 oscillates at a predetermined oscillation frequency fs in the optical axis direction (z-axis direction) with respect to the sample S.

Specifically, the focus oscillation control device 40 sets the oscillation frequency fs so that, with respect to an image pickup period Ti that is determined by the charge transfer rate and the number of transfer pixels in TDI driving in the image pickup device 20, the oscillation frequency fs coincides within a predetermined range with Ns times (Ns is an integer not less than 1) the basic frequency, which is a reciprocal 1/Ti of the image pickup period, to control focus oscillation. In this embodiment, the focus oscillation control device 40, by varying the position of the objective lens 32 in the optical axis direction by the focus adjusting mechanism 33, oscillates the image pickup focus in the sample S. Accordingly, an image with a focus extended is acquired as an observation image of the sample S as to be described later.

For the sample stage 10, the stage control device 12, the image pickup device 20, the image pickup optical system 30, and the focus oscillation control device 40, a control device 50 that controls the operations of respective parts of the apparatus is provided. The control device 50 consists of a computer including, for example, a CPU and necessary storage devices such as a memory and a hard disk. To this control device 50, a display unit 56 and an input unit 57 are connected. The display unit 56 is, for example, a CRT display or a liquid crystal display, and is used for displaying operation screens necessary for operations of the image acquisition apparatus 1A, displaying an acquired observation image of the sample S, and the like. The input unit 57 is, for example, a keyboard or a mouse, and is used for inputting necessary information for image acquisition, inputting instructions for an image acquiring operation, and the like.

In the configuration shown in FIG. 1, the control device 50 includes an image pickup control unit 51 and a focus control unit 52. The image pickup control unit 51 controls an image pickup operation of the sample S by TDI driving in the image pickup device 20. The focus control unit 52 controls an oscillation operation of the focus of image pickup by the focus oscillation control device 40. Such control of the image pickup operation and the focus oscillation operation is performed automatically or based on an operator's instruction etc.

In the image acquisition apparatus 1A with this configuration, for performing image acquisition of the sample S, first, the sample S placed on the stage 10 is moved to the image pickup position by the macro image pickup device 38 by driving the XY stage 10. Then, a low-resolution macro image showing a whole image of the sample S is acquired by the image pickup device 38, and by use of this macro image, image pickup conditions such as a range to be an actual image pickup object are recognized and set in the control device 50.

Here, as the sample S of an image pickup object, for example, a slide glass that carries a biological sample placed thereon can be used. In this case, the range where the biological sample exists in the slide glass is recognized as an image pickup object range. When a biological sample itself is placed on the stage 10 as a sample S, no slide glass is necessary. When an image pickup object range is determined in advance, no such macro image pickup device 38 is necessary.

Next, the sample S an image pickup object range of which has been recognized is moved to the image pickup position by the image pickup device 20 and the image pickup optical system 30 by driving the XY stage 10. By performing focus measurement for the image pickup object range of the sample S while controlling the focus by the focus adjusting mechanism 33, focus position information when scanning the sample S is obtained. In this case, the focus position may be fixed for the whole of the image pickup object range, or the focus position may be different depending on the image pickup position like, for example, a focal plane and a two-dimensional focus map. For focus measurement for the sample S, various methods may be used specifically. When imaging is performed for the sample S focus position information of which has been provided in advance, no such focus measurement is necessary.

Subsequently, referring to the obtained focus position information, acquisition of a micro image as a high-resolution observation image of the sample S is executed by TDI driving of the image pickup device 20 and scanning of the sample S on the sample stage 10. At this time, as described above, the focus oscillation control device 40 oscillates the image pickup focus in the sample S at the oscillation frequency fs set so as to substantially coincide with Ns times the basic frequency, which is a reciprocal 1/Ti of the image pickup period Ti in the image pickup device 20. Accordingly, an observation image with an extended focus for the sample S is acquired.

Figure 3:
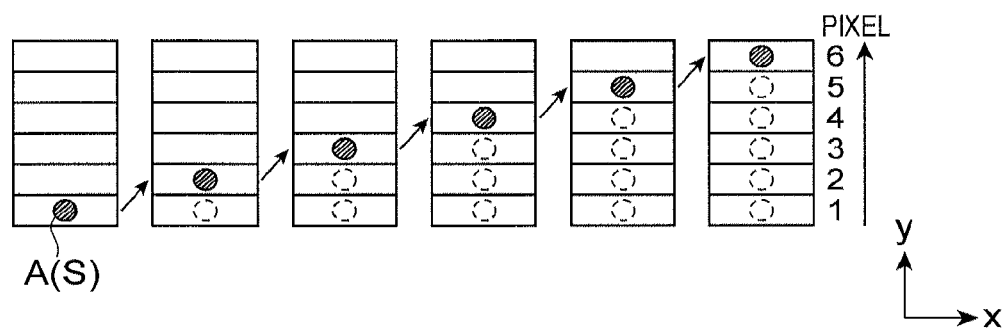
FIG. 3 is a schematic view showing TDI driving in the image pickup device.
Figure 3:
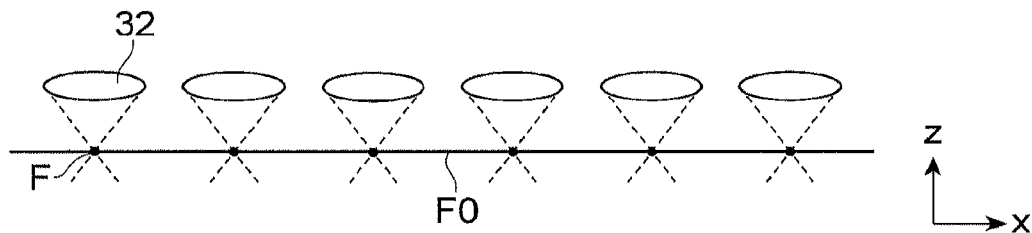
Figure 3:
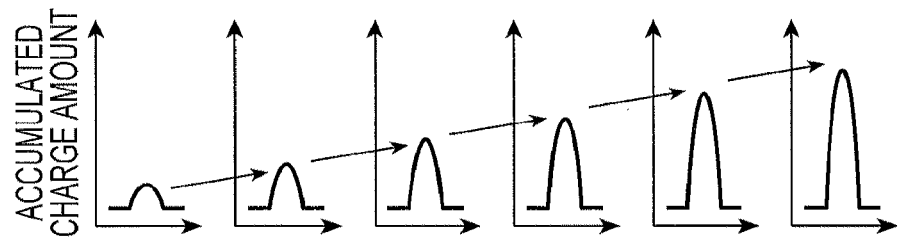
Figure 4:
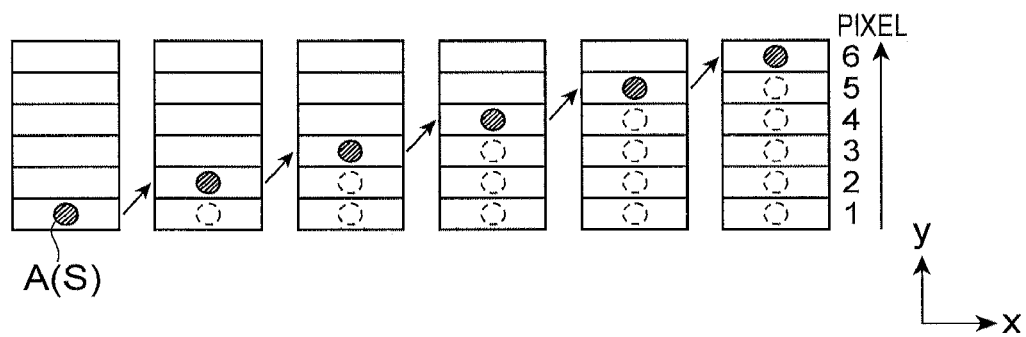
FIG. 4 is a schematic view showing TDI driving in the image pickup device and oscillation control of an image pickup focus in a sample.
Figure 4:
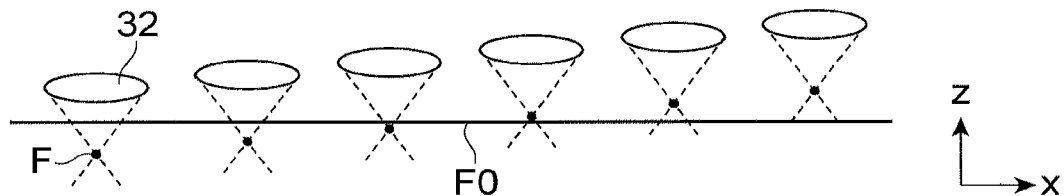
Figure 4:
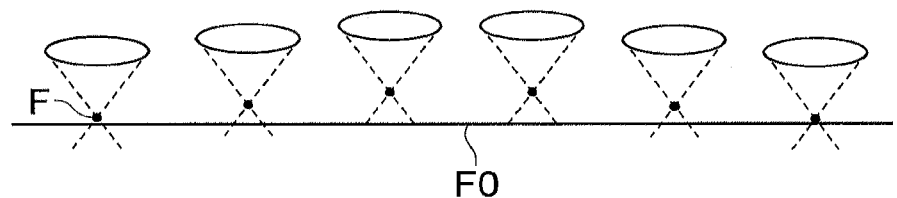
Figure 4:
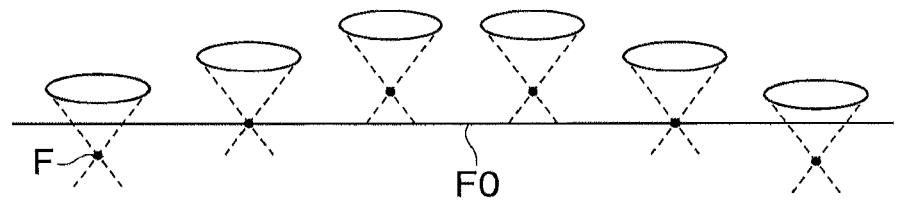

The image pickup operation and the focus oscillation operation in the image acquisition apparatus 1A shown in FIG. 1 and FIG. 2 will be described more specifically with reference to FIG. 3 to FIG. 5. In FIG. 3 and FIG. 4, for simplification of description, the number of transfer pixels in the y-axis direction (vertical direction of the CCD sensor) to be a charge transfer direction in TDI driving is provided as 6 pixels, and a method for TDI driving is schematically illustrated.

FIG. 3 is a schematic view showing an image pickup operation for the sample S by TDI driving in the image pickup device 20. (a) in FIG. 3 shows a movement of an image pickup object in TDI driving and a vertical transfer of a charge in the photodetection section of the CCD sensor. (b) in FIG. 3 shows temporal change in the position in the optical axis direction of the objective lens 32 and an image pickup focus F. (c) in FIG. 3 shows temporal change in accumulated charge amount due to TDI driving.

As shown in (a) in FIG. 3, in the image pickup operation by TDI driving, when performing image acquisition while scanning the sample S in the y-axis direction by the image pickup device 20, the sample stage 10 and the image pickup device 20 are driven so that a movement of an image pickup object (image pickup object portion) A in the sample S and a charge transfer in the vertical shift register of the photodetection section of the CCD sensor are synchronized with each other. In this driving method, as shown in (c) in FIG. 3, the charge generated by photoelectric conversion and accumulated is increased every time a charge is transferred in pixels 1 to 6 in data acquisition of the image pickup object A.

Accordingly, in the TDI sensor whose number of transfer pixels in the vertical direction is n stages (in the example of FIG. 3, 6 stages), its exposure time, that is, the image pickup period Ti in TDI driving can be extended to n times as compared with that of a one-dimensional line sensor (n=1) and the like, so that the sample S can be imaged at high sensitivity. In such scanning and imaging of the sample S, the position in the optical axis direction of the objective lens 32 and the image pickup focus F in the sample S by the same, these are, in the conventional configuration, for example, kept fixed at a reference focus position F0 as shown in (b) in FIG. 3, or normal focus control is performed based on focus position information such as a focal plane and a two-dimensional focus map.

FIG. 4 is a schematic view showing TDI driving in the image pickup device 20 and oscillation control of an image pickup focus F in the sample S. Here, a movement of an image pickup object A and a vertical transfer of a charge shown in (a) in FIG. 4 are the same as those shown in (a) in FIG. 3. (b) in FIG. 4 to (d) in FIG. 4 show temporal changes in the position in the optical axis direction of the objective lens 32 in response to TDI driving in the image pickup device 20 and in the focus F of image pickup in the sample S by the same, respectively.

In the operation example shown in (b) in FIG. 4, the objective lens 32 is moved in the optical axis direction in response to the TDI operation shown in (a) in FIG. 4, and the focus F is changed in a certain upper and lower range including the reference focus position F0. At this time, in an accumulated charge in the CCD sensor corresponding to the image pickup object A, not information on a single focus position but information on all focus positions which are passed during a movement of a charge from pixel 1 to pixel 6 is accumulated, so that the depth of focus in an observation image to be acquired is substantially extended. This focus extension is a basic principle of acquisition of an extended focus image of the sample S.

However, in imaging of the sample S using the TDI driving image pickup device 20, since the above-described image pickup operation is continuously performed for image pickup object portions in the sample S, the starting point of variation of the focus F is different in position for each image pickup object portion. For example, in the operation example shown in (c) in FIG. 4, since the focus position as a starting point is present in the vicinity of above the reference focus position F0, only information on focus positions above the reference focus position F0 is accumulated, and information on focus positions below the same is not accumulated. That is, in the operation method shown in (b) and (c) in FIG. 4, the same focus extension effect cannot be obtained for all image pickup object portions in imaging of the sample S using TDI driving.

On the other hand, in the image acquisition apparatus 1A shown in FIG. 1, a reciprocal 1/Ti of an image pickup period Ti in TDI driving is set to an oscillation frequency fs, and the position of the objective lens 32 and the image pickup focus F is oscillated in the optical axis direction at this frequency fs. At this time, as shown in (d) in FIG. 4, for the period of the TDI operation, the image pickup focus F changes in a certain upper and lower range (oscillation range) including the reference focus position F0 so that its focus position reciprocates. With this configuration, even when the starting point of oscillation of the focus F is different, the focus position always passes through the whole of the oscillation range. Therefore, in this operation method, the same focus extension effect can be obtained for all image pickup object portions in imaging of the sample S, and an extended focus image can be suitably acquired on the same conditions for the whole of the image pickup object range of the sample S.

Figure 5:
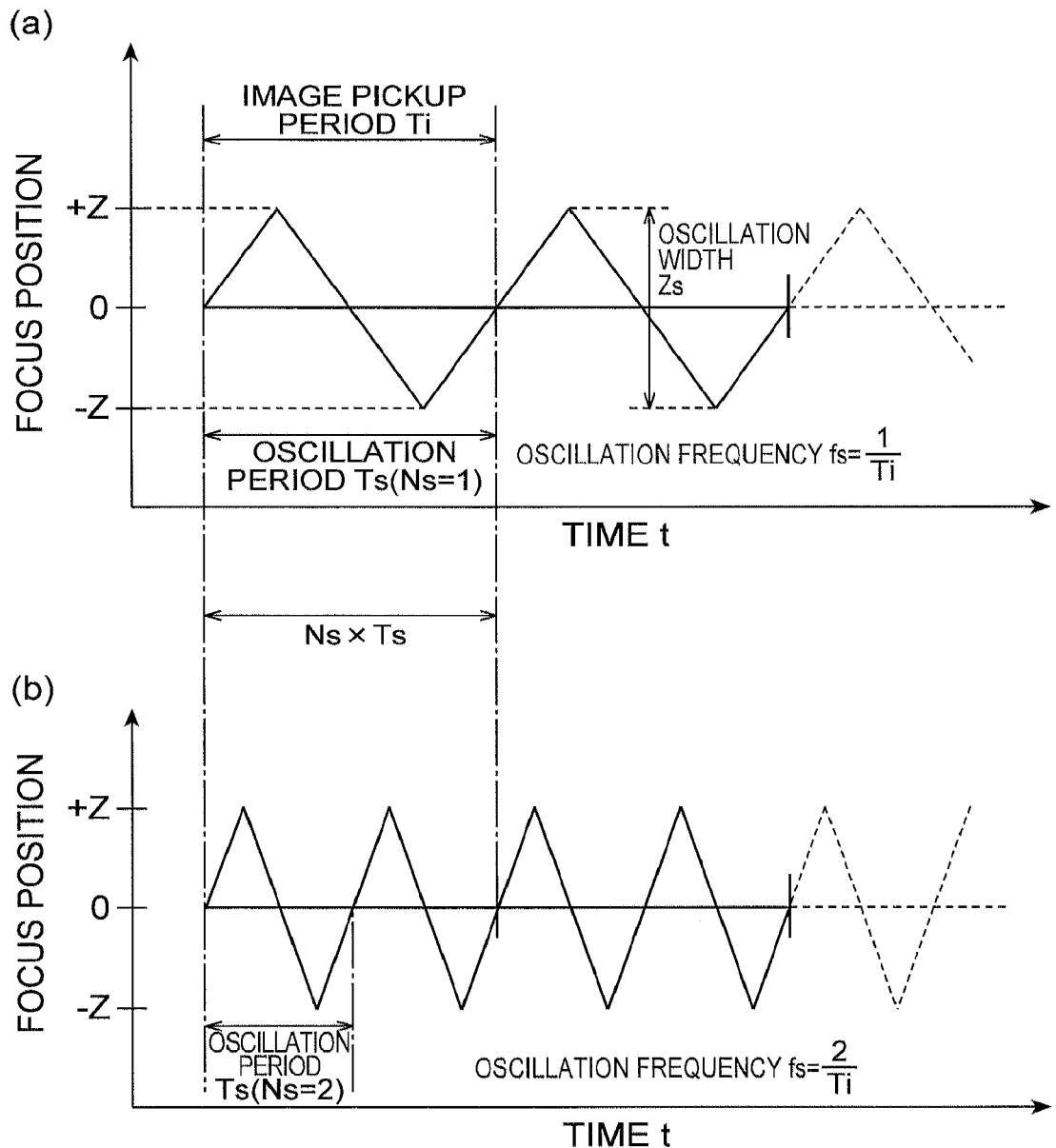
FIG. 5 is a figure with graphs showing synchronous control between TDI driving and focus oscillation.

FIG. 5 is a figure with graphs showing synchronous control between TDI driving and oscillation of the focus F in the above-described image acquisition apparatus 1A. Here, the case of performing oscillation control of the focus F using triangle waves as a temporal waveform of the oscillation is shown as examples.

The graph (a) of FIG. 5 shows an example of oscillation control of the focus F when, as described above for (d) in FIG. 4, a reciprocal 1/Ti of an image pickup period Ti in TDI driving is set to an oscillation frequency fs. In this operation example, with the reference focus position provided as a position 0, the focus position is oscillated in a range having upper and lower limits of −Z~+Z and an oscillation width of Zs. In this case, the oscillation count of the focus for the image pickup period Ti is Ns=1, and the oscillation period is Ts=Ti. The oscillation total period Ns×Ts with the whole of the oscillation count Ns coincides with the image pickup period Ti.

Such acquisition of a focus extended image is not limited to the configuration of the reciprocal 1/Ti of the image pickup period Ti in TDI driving being set to the oscillation frequency fs directly. That is, more generally, a configuration of setting an oscillation frequency fs so as to be Ns times (Ns is an integer not less than 1, fs=Ns/Ti) the basic frequency, which is a reciprocal 1/Ti of the image pickup period Ti can be used. Also in this case, similar to the above, an extended focus image can be suitably acquired.

The graph (b) of FIG. 5, as an example of such operation, shows an example of oscillation control of the focus F when 2/Ti which is twice a reciprocal of an image pickup period Ti in TDI driving is set to an oscillation frequency fs. In this case, the oscillation count of the focus for the image pickup period Ti is Ns=2, and the oscillation period is Ts=Ti/2. The oscillation total period Ns×Ts with the whole of the oscillation count Ns coincides with the image pickup period Ti. Also in the case where Ns is set to 3 or more, oscillation control and acquisition of an extended focus image can be similarly executed.

Effects of the image acquisition apparatus 1A according to the present embodiment will be described.

In the image acquisition apparatus 1A shown in FIG. 1 and FIG. 2, an image pickup device including the two-dimensional CCD sensor 25 capable of acquiring a two-dimensional image whose longitudinal direction is along the x-axis direction and TDI driving is used as the image pickup device 20 for scanning the sample S. TDI driving is a driving method, as shown in FIG. 3, by synchronizing the timing of vertical transfer of a charge generated in each pixel and the movement timing of the image pickup object A in the sample S with each other, for performing integrating exposure corresponding to the number of pixel stages in the y-axis direction in the a two-dimensional pixel structure. By using this image pickup device 20, image acquisition at high sensitivity can be performed for the sample S.

The apparatus scans the sample S in a predetermined scanning direction (in the above-described example, the y-axis direction perpendicular to the longitudinal direction of the pixel structure of the CCD sensor 25) to acquire an observation image by the image pickup device 20 and the image pickup optical system 30 including the objective lens 32, and performs image acquisition while oscillating the image pickup focus F at the oscillation frequency fs in the optical axis direction for the sample S. Accordingly, an observation image of the sample S with a focus F extended is obtained.

Further, in the TDI driving image pickup device 20, the image pickup period Ti which is a substantial exposure time for each image pickup object portion A of the sample S is determined by a product of the transfer rate of a charge per one pixel synchronized with movement of the image pickup object A and the number of transfer pixels (number of pixel stages in the vertical direction). For example, when the charge transfer rate that is in synchronization with the scanning rate of the sample S is 0.2 msec/pixel and the number of transfer pixels in the vertical direction is 64 pixels, the image pickup period is Ti=0.2×64=12.8 msec.

For this image pickup period Ti in TDI driving of the image pickup device 20, in the image acquisition apparatus 1A described above, focus oscillation in the sample S by the focus oscillation control device 40 is controlled so that the oscillation frequency fs coincides with Ns times the basic frequency, the basic frequency being a reciprocal 1/Ti of the image pickup period. Accordingly, TDI driving in the image pickup device 20 and oscillation of the focus F can be synchronized with each other to acquire an extended focus image of the sample S efficiently and reliably.

The charge transfer rate, the image pickup period Ti in the image pickup device 20, and the oscillation frequency fs of the focus are set according to the specific configuration of the image pickup optical system 30 such as the magnification of the objective lens 32, and the configuration of the image pickup device 20 and the like. For example, for an objective lens with a magnification of 40 times, when the image pickup period in the image pickup device 20 is provided as Ti=12.8 msec as described above, the oscillation frequency of the focus is fs=1/Ti=78 Hz if the oscillation count is Ns=1.

Here, in oscillation control by the focus oscillation control device 40, the oscillation range −Z~+Z of the focus F may have an oscillation range different between the positive side and negative side with respect to the reference focus position F0. The oscillation width Zs may be a constant oscillation width in the whole of scanning of the sample S, or the oscillation width may be changed during scanning. The oscillation width Zs is preferably set in consideration of the thickness and the like of the sample S of an image pickup object. With regard also to the reference focus position F0, a position offset upward and downward from an optimal focus position obtained by focus measurement may be used as a reference focus position.

With regard to the temporal waveform of focus oscillation, an example using triangle waves is shown in FIG. 5, however, various oscillation waveforms may be used specifically as long as it allows oscillation of a focus with a predetermined period and frequency. Examples of such waveforms include oscillation waveforms of sine waves and cosine waves. When sine waves are used, there is an advantage that variation in the position of the objective lens 32 and focus position becomes smoother than with triangle waves. It is preferable to set such an oscillation waveform in consideration of characteristics of a mechanism that actually oscillates the focus and its driving method.

With regard to a specific setting of the oscillation frequency fs of the focus, in the example of focus control described above, the oscillation frequency fs is set so as to coincide substantially with Ns times the basic frequency 1/Ti. In this case, TDI driving in the image pickup device 20 and focus oscillation by the focus oscillation control device 40 can be completely synchronized with each other to acquire an observation image of the sample S with a focus extended reliably and accurately for the whole of the oscillation width Zs of the focus F.

The oscillation frequency fs of the focus may be set, generally, in consideration of an allowable range etc., assumed from the viewpoint of the image pickup accuracy etc. with regard to a deviation in the frequency of focus oscillation, so that the oscillation frequency fs coincides within a predetermined range with Ns times the basic frequency. Also with this configuration, TDI driving in the image pickup device 20 and oscillation of the focus F can be synchronized with each other with sufficient accuracy to acquire an extended focus image of the sample S efficiently and reliably. As such a predetermined range, for example, it is preferable that, with the oscillation period of the focus provided as Ts, and the oscillation count of the focus for the image pickup period Ti provided as Ns, the oscillation total period Ns×Ts with the whole of the oscillation count Ns coincides with the image pickup period Ti within a range of 50% of the oscillation period Ts on the condition of not falling below the oscillation period Ts.

With regard to the predetermined range of synchronization between TDI driving and focus oscillation, specifically, it is preferable, in the focus oscillation control device 40, to set the oscillation frequency fs so that, with the oscillation period of the focus provided as Ts, the number of oscillations of the focus for the image pickup period Ti provided as Ns, the oscillation width of the focus in the optical axis direction provided as Zs, and the width of the depth of focus provided as 2D, the oscillation total period Ns×Ts with the whole of the oscillation count Ns coincides with the image pickup period Ti within the range of an allowable period deviation ΔTs satisfying the following expression.

$$\Delta Ts/Ts = D/2Zs$$

With this configuration, an observation image of a sample with a focus extended can be suitably acquired for the whole of the oscillation width Zs of the focus.

Alternatively, it is preferable, in the focus oscillation control device 40, to set the oscillation frequency fs so that, with the wavelength of light provided as λ (for example, it suffices with a visible light wavelength of 0.4 μm to 0.7 μm, and preferably, a wavelength of green λ=0.55 μm that is generally used as a reference wavelength), the numerical aperture of the objective lens 32 provided as NA, the refractive index of a medium (for example, air) between the objective lens 32 and the sample S provided as n, the oscillation period of the focus provided as Ts, the number of oscillations of the focus for the image pickup period Ti provided as Ns, and the oscillation width of the focus in the optical axis direction provided as Zs, the oscillation total period Ns×Ts with the whole of the oscillation count Ns coincides with the image pickup period Ti within the range of an allowable period deviation ΔTs satisfying the following expression.

$$\Delta Ts/Ts = n\lambda/4Zs(NA)^2$$

Also with this configuration, an observation image of a sample with a focus extended can be suitably acquired for the whole of the oscillation width Zs of the focus.

Figure 6:
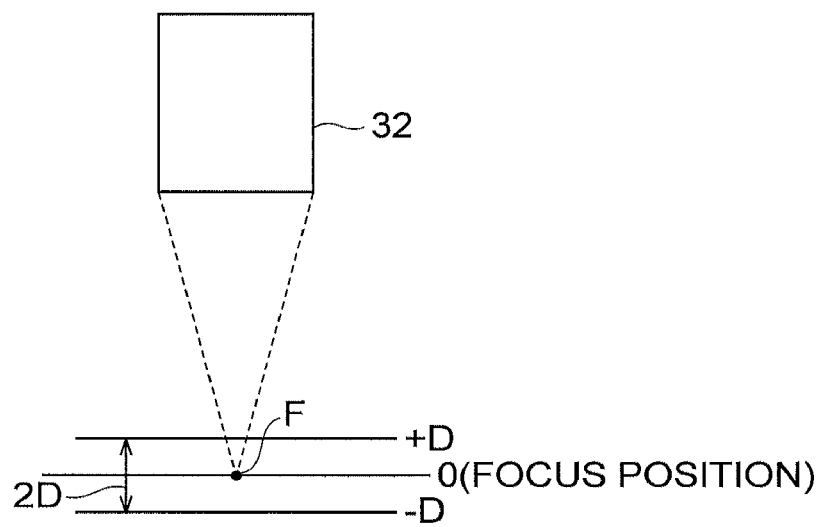
FIG. 6 is a view showing an allowable period deviation of focus oscillation in synchronous control between TDI driving and focus oscillation.
Figure 6:
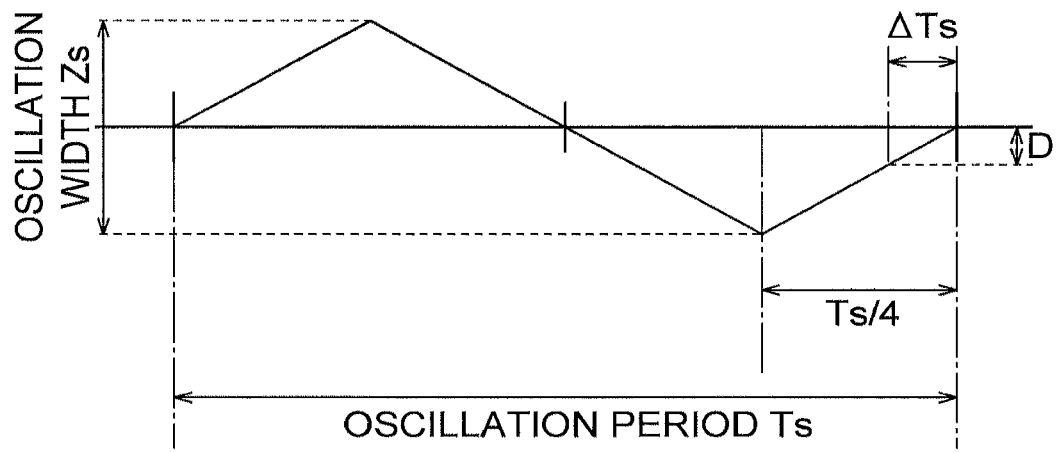

The allowable period deviation ΔTs in synchronization between TDI driving and focus oscillation described above will be described with reference to FIG. 6. FIG. 6 is a view showing an allowable period deviation of focus oscillation in synchronous control between TDI driving and focus oscillation. (a) in FIG. 6 shows the focus F and the depth of focus in imaging by using the objective lens 32. (b) in FIG. 6 is a graph for explaining the allowable period deviation ΔTs of focus oscillation described above.

As shown in (a) in FIG. 6, the depth of focus by the objective lens 32 can be expressed as +D to the positive side and −D to the negative side with respect to the focus position F. The width of the depth of focus as a whole is 2D at this time. With the existence of this width 2D of the depth of focus taken into consideration, it can be considered that a focus extension effect substantially equivalent to that when TDI driving and focus oscillation are substantially in synchronization with each other can be obtained within that range even when TDI driving and focus oscillation become out of synchronization with each other. Therefore, the allowable period deviation ΔTs can be set based on the width 2D of the depth of focus by the objective lens 32.

Here, as shown in the graph of (b) in FIG. 6, a case where the oscillation period of the focus is Ts, the oscillation count of the focus for the image pickup period Ti is Ns=1, and the oscillation width of the focus in the optical axis direction is Zs is considered. In such focus oscillation, even when the amount of oscillation is smaller by the width D of one side of the depth of focus at the end point of the oscillation period Ts, one period of focus oscillation is achieved in a pseudo manner due to an effect of the depth of focus D. Therefore, based on this depth of focus D, the allowable period deviation ΔTs to be in a range where one period of focus oscillation can be realized in a pseudo manner can be calculated for the oscillation period Ts.

For this allowable period deviation ΔTs, as can be understood from the graph of (b) in FIG. 6, Zs/2:Ts/4=D:ΔTs holds. Therefore, based on this relationship, the above-described expression for the allowable period deviation ΔTs can be obtained.

$$\Delta Ts/Ts = D/2Zs$$
$$= 100 \times D/2Zs(\%)$$

Further, the depth of focus ±D, which has been variously defined, is generally approximated as:

$$D = n\lambda/2(NA)^2$$

where the wavelength of light is provided as λ, the numerical aperture of the objective lens 32 is provided as NA, and the refractive index of the medium between the objective lens 32 and the sample S is provided as n as described above. When this depth of focus D is substituted into the above-described allowable period deviation ΔTs, the following expression is obtained.

$$\Delta Ts/Ts = n\lambda/4Zs(NA)^2$$
$$= 100 \times n\lambda/4Zs(NA)^2(\%)$$

Therefore, these conditional expressions regarding ΔTs/Ts can be applied as an allowable period deviation ΔTs in oscillation control of the focus. These conditional expressions can also be similarly applied when the oscillation count Ns of focus oscillation is 2 or more.

As a specific example of the allowable period deviation ΔTs, a case of acquiring images with different magnifications using objective lenses with different numerical apertures NA is considered. Here, with regard to the parameters described above, the wavelength of light is provided as λ=0.55 μm, the refractive index of air as a medium between the objective lens and the sample is provided as n=1, and the oscillation width corresponding to the thickness of the sample S is provided as Zs=10 μm. At this time, when an objective lens with a magnification of 40 times and a numerical aperture of NA=0.75 is used, the depth of focus is D=0.49 μm and the allowable period deviation is ΔTs=2.45%. When an objective lens with a magnification of 20 times and a numerical aperture of NA=0.5 is used, the depth of focus is D=1.1 µm and the allowable period deviation is ΔTs=5.5%.

Next, a case of acquiring images with different magnifications using one objective lens is considered. Generally, in oscillation control of a focus, its oscillation frequency fs takes different values depending on the magnification and the like of the objective lens, but when the oscillation frequency is excessively high, a suitable image pickup condition cannot be obtained due to resonance with an optical system in some cases. In response to this problem, for example, a method of using a single objective lens with a high magnification (for example, 40 times) in imaging of the sample S, and for an image with a low magnification (for example, 20 times), creating the image by a binning process can be used. In this case, the numerical aperture of the objective lens is NA=0.75 regardless of the magnification and the allowable period deviation is ΔTs=2.45%.

Here, examples of a method for extending the depth of focus without using oscillation control of a focus in imaging of the sample S include a method of reducing the aperture of the objective lens and condenser lens in an image pickup optical system. At this time, since the depth of focus is in inverse proportion to the second power of the numerical aperture NA as described above, the depth of focus is increased when the numerical aperture NA is reduced. However, in such a method, the spatial resolution and image quality degrades.

Since the size that a microscope can resolve is in inverse proportion to the sum of the NA of the objective lens and the NA of the condenser lens, when the NA of the condenser lens is reduced, the resolvable size is increased to degrade resolution. The NA of an objective lens is generally fixed for each lens. Therefore, there is a limit to extension of the depth of focus by reducing the NA of a condenser lens.

As a method for extending the depth of focus, a method for creating by an arithmetic operation an extended focus image from a plurality of observation images acquired by the Z-stack is considered. However, in such a method, there is a problem such that it requires a long time to acquire a plurality of Z-stack observation images, as described above.

The image pickup method by the Extended Depth of Focus described in Patent Document 3 (U.S. Pat. No. 7,444,014), which is for performing imaging for one field of view of a microscope using a two-dimensional sensor, cannot be applied to a configuration for performing imaging while scanning a sample using a TDI driving image pickup device. In this configuration, when acquiring a large field of view image without scanning a sample, it is necessary to continue a step and repeat operation of moving a field of view and performing focus oscillation and image acquisition every time the field of view is moved, so that the image acquisition time as a whole is lengthened.

Moreover, in Patent Document 5 (Japanese Translation of International Application No. 2004-507743), by disposing a TDI sensor tilted with respect to the scanning direction in scanning of a sample using a TDI sensor, the depth of focus is extended. However, acquisition of an extended focus image by this configuration involves the following problem.

That is, the position of the image pickup device and the focus position on a sample have a relationship of the second power with respect to the total magnification of a microscope. For example, when the total magnification of a microscope is 20 times, for performing a focus extension of 10 µm on a sample, it is necessary, on the image pickup device side, to secure a width of 20×20×10 µm=4 mm. For realizing this by tilting the image pickup device, it is necessary to set the size in the transfer direction of the TDI sensor to 8 mm or more when the tilt angle is assumed to be 30 degrees.

Generally, in a TDI sensor, as schematically shown in FIG. 2, the number of pixels in the vertical transfer direction is smaller than that in the horizontal direction. For example, in S10202-16 manufactured by Hamamatsu Photonics K.K., the number of pixels in the vertical direction is 128 relative to the number of pixels 4096 in the horizontal direction, and the width of one pixel in the vertical direction is 12 µm. In this case, the width in the vertical transfer direction of the photo-detection section as a whole of the TDI sensor is 128×12 µm=1536 µm.

In this configuration, under the condition of the total magnification of a microscope of 20 times described above, only a focus extension of approximately 1.915 µm can be obtained on a sample. Therefore, in order to realize a wide focus extension with this configuration, it is necessary to reduce the magnification of the whole at the expense of the resolution, or use a TDI sensor of a special structure, such as increasing the number of pixels or increasing the pixel width in the vertical transfer direction of TDI driving. Further, in a configuration for allowing a width in the focus position by the sensor size and its tilt, the optical magnification changes simultaneously with a change in the focus position on a sample, and therefore, distortion sometimes occurs in an image subjected to a focus extension.

In a configuration of tilting a TDI sensor with respect to the optical axis, the range of focus extension is determined by the total magnification of an optical system and the width in the vertical transfer direction of the TDI sensor. On the other hand, in the TDI sensor, the positional accuracy between the moving direction of a sample and the sensor has an effect on the image quality, and thus it is preferable to fix the TDI sensor after adjusting the position and the like. When the angle by which the TDI sensor is tilted is changed, the relative moving speed of an image pickup object on the sensor is also changed, and thus it is also necessary to change a transfer clock and the like in TDI driving. Based on these points, in the configuration of tilting a TDI sensor with respect to the optical axis, it is difficult to control the conditions of focus extension variably.

On the other hand, the image acquisition apparatus 1A of the above-described embodiment scans the sample S to acquire an observation image by the image pickup device 20 including the TDI sensor and the image pickup optical system 30 including the objective lens 32, and performs image acquisition while oscillating its image pickup focus F at the oscillation frequency fs that is in synchronized with the TDI operation in the optical axis direction for the sample S. Accordingly, as described above, an extended focus image can be acquired efficiently and reliably. Further, in this configuration, by setting a focus oscillation condition, the conditions of focus extension can be variably controlled.

A specific configuration of the image acquisition apparatus 1A shown in FIG. 1 will be further described. With regard to a configuration for oscillating a focus for the sample S, in the configuration example shown in FIG. 1, the focus oscillation control device 40 oscillates the focus F for the sample S by physically varying in the optical axis direction the position of the objective lens 32 via the focus adjusting mechanism 33. As the focus adjusting mechanism 33 in this case, for example, a piezo-actuator attached to the objective lens 32 can be used. As the focus oscillation control device 40, for example, a drive control device of a piezo-actuator can be used. As the focus adjusting mechanism 33, for example, a voice coil motor, a stepping motor, a servo motor, or the like may be used. With regard to the focus oscillation control device 40, the focus adjusting mechanism 33 itself may function as focus oscillation control means.

As a configuration for oscillating a focus, as shown by the dashed line in FIG. 1, the focus oscillation control device 40 may oscillate the focus F in the sample S by varying in the optical axis direction the position of the sample stage 10 via the stage control device 12. In this case, as the sample stage 10, it is necessary to use one having a Z-stage function. Also in this configuration, the sample stage 10 and the stage control device 12 themselves may function as focus oscillation control means.

In the image acquisition apparatus 1A shown in FIG. 1, the control device 50 including the image pickup control unit 51 that controls an image pickup operation by TDI driving and the focus control unit 52 that controls a focus oscillation operation is provided. By providing such a control device 50, the operations of respective parts of the apparatus including synchronization between TDI driving and focus oscillation can be suitably controlled and executed.

In this case, it is preferable that the focus control unit 52 controls the focus oscillation operation by the focus oscillation control device 40 based on whether to use focus oscillation and a focus oscillation condition specified in the control device 50. In this case, with regard to whether to use focus oscillation and a focus oscillation condition, a configuration for specifying these according to input contents by an operator through the input unit 57 connected to the control device 50 can be used.

Figure 7:
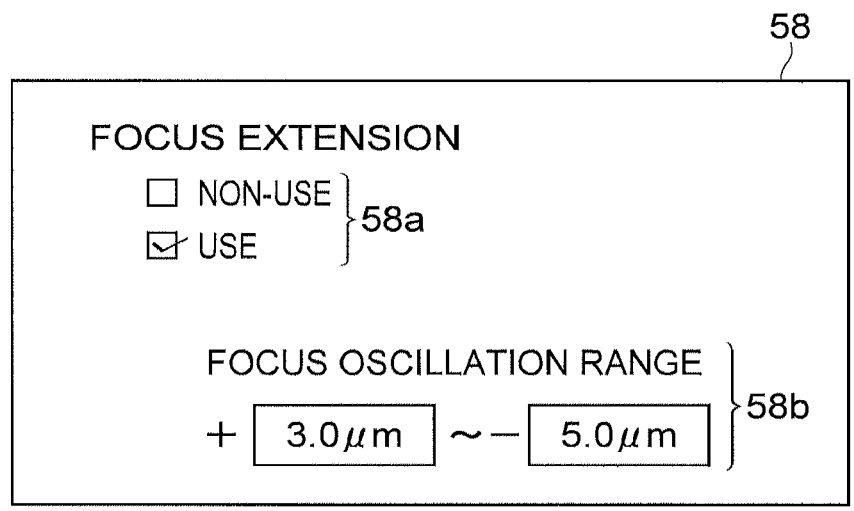
FIG. 7 is a view showing an example of a specification screen of whether to use focus oscillation and a focus oscillation condition.

When focus oscillation is thus controlled based on the input contents through the input unit 57, it is preferable that the control device 50 displays, by the display unit 56, a specification screen to let the operator enter those control conditions. FIG. 7 is a view showing an example of such a specification screen of whether to use focus oscillation and a focus oscillation condition. In the specification screen 58 shown in FIG. 7, a first input portion 58*a* for letting an operator specify whether to use focus oscillation (whether focus extension is necessary) and a second input portion 58*b* for letting an operator specify a focus oscillation condition are provided. In the second input portion 58*b*, respective upper and lower ranges of the oscillation width to specify a focus oscillation range can be separately specified in the unit of submicrons as the focus oscillation condition.

With regard to these control conditions of focus oscillation, a configuration for specifying the control conditions by automatic processing using a computing program in the control device 50 may be used. As such a configuration, for example, there is considered a configuration of automatically detecting the thickness of the sample S by measurement, and automatically setting the oscillation width of the focus based on the result.

Further, the allowable period deviation $\Delta T s$ in oscillation control of the focus can be calculated, as described above, using the parameters such as the oscillation width (thickness of the sample S) Zs and the numerical aperture NA of the objective lens 32. Therefore, if the necessary parameters such as the numerical aperture NA are stored in advance in the control device 50, the allowable period deviation $\Delta T s$ can be automatically calculated by specifying the oscillation width Zs and the like. This allowable period deviation $\Delta T s$ can also be used, in oscillation control of the focus, for error detection when the period deviation has exceeded $\Delta T s$ or an instruction to measure again.

An observation image of the sample S acquired in the image acquisition apparatus 1A contains information in a wide focus range due to focus extension described above, but when the oscillation range of the focus is wide, information of an out-of-focus portion is sometimes reflected as a blur component in an image. If such a blur component becomes a problem, the blur component can be eliminated by performing image processing. As an example of the image processing in this case, an unsharp mask filter is applied to the observation image as a simple method, whereby the image quality can be improved.

A histogram equalization method or a method for eliminating a blur component by a deconvolution process based on optical parameters and the oscillation width of the objective lens 32 can also be used. These image processings may be, in the configuration shown in FIG. 1, executed in the image processing device 21, or may be executed in the control device 50. Such image processing for deblurring may be executed in real time in synchronization with acquisition of an observation image, or may be separately executed after image acquisition.

Figure 8:
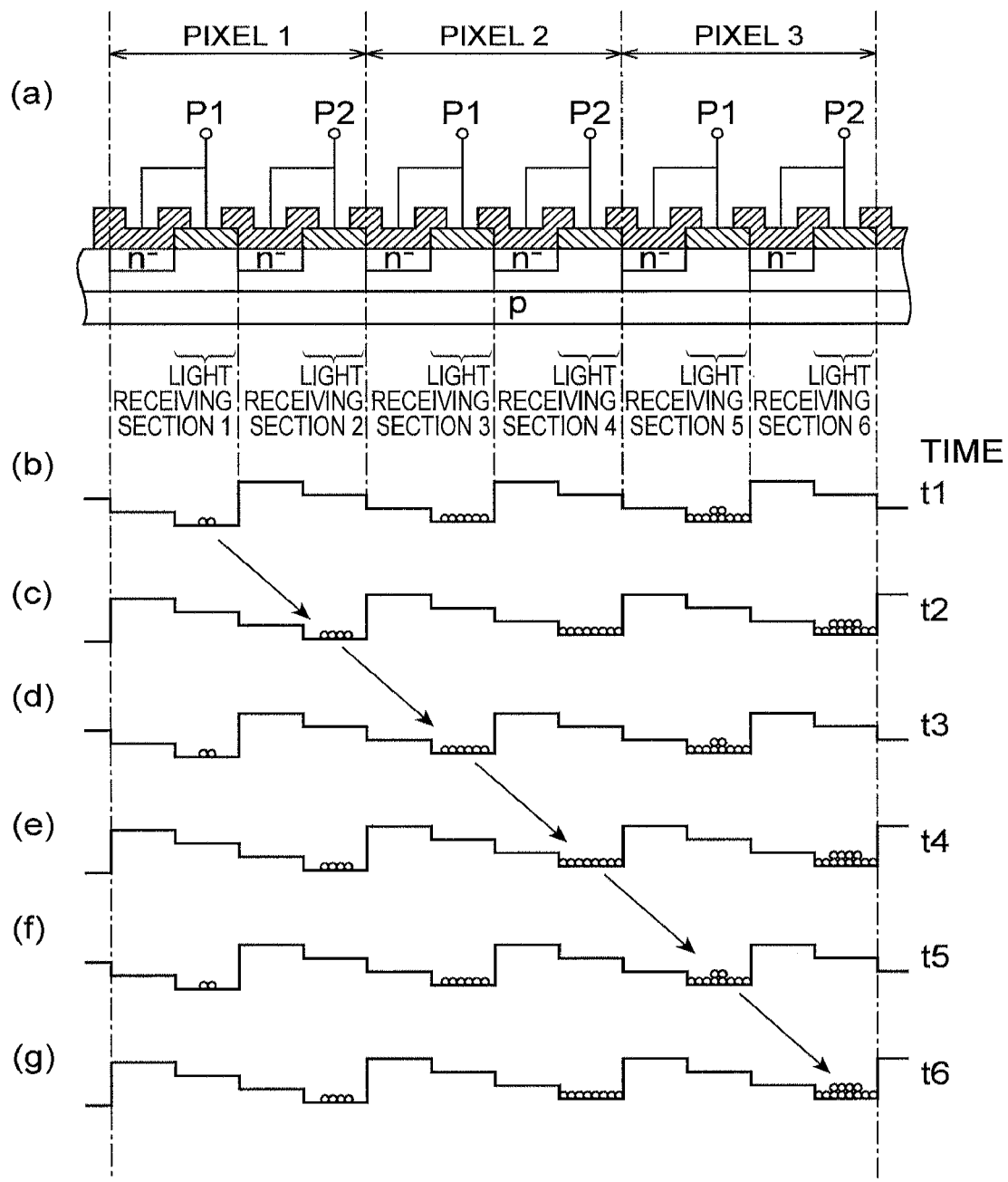
FIG. 8 is a view showing an example of an image pickup operation by TDI driving in the image pickup device.
Figure 9:
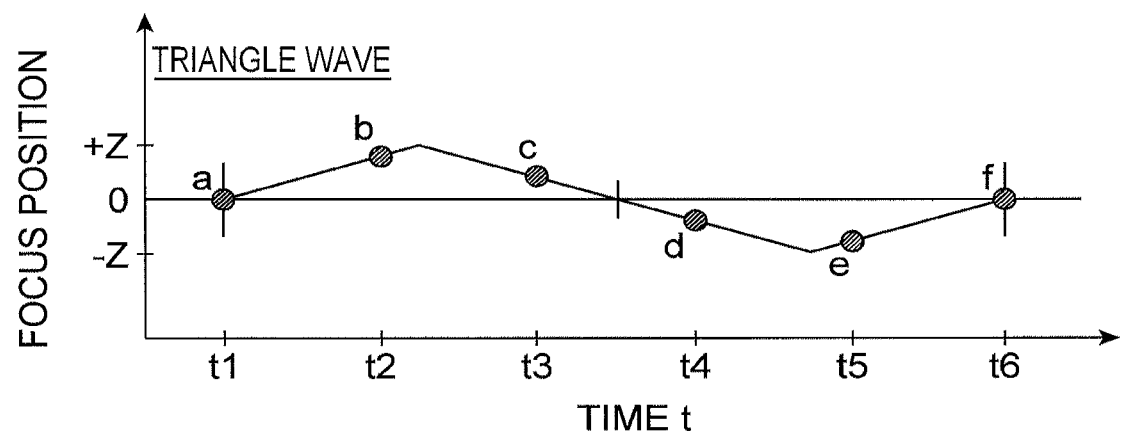
FIG. 9 is a view showing examples of an oscillation operation of a focus with respect to the sample.
Figure 9:
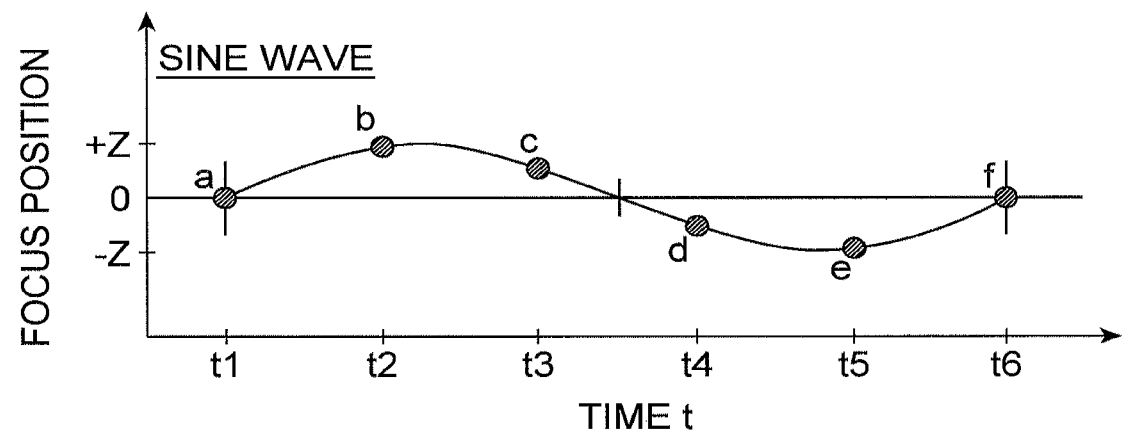

A specific example of TDI driving in the two-dimensional CCD sensor used in the image pickup device 20 and oscillation control of the focus in synchronization therewith will be described. FIG. 8 is a view showing an example of an image pickup operation by TDI driving in the image pickup device 20. FIG. 9 is a view showing examples of an oscillation operation of a focus with respect to the sample S.

In TDI driving of the CCD sensor shown in FIG. 8, the number of transfer pixels in terms of the vertical direction is provided as three pixels (six light receiving sections). In focus oscillation control shown in FIG. 9, the number of oscillations of the focus for the image pickup period Ti is provided as Ns=1. In FIG. 9, graph (a) shows focus oscillation when triangle waves are used as an oscillation waveform, and graph (b) shows focus oscillation when sine waves are used as an oscillation waveform.

In FIG. 8, (a) in FIG. 8 shows a configuration of a photodetection section of the two-dimensional CCD sensor in the vertical transfer direction. In this configuration example, a two-phase driving CCD sensor by two-phase transfer voltages P1, P2 is used. In this two-phase driving CCD sensor, the light receiving section in each of the pixels 1 to 3 is divided into two parts in the vertical direction, and a part of these at a downstream side in the transfer direction with a lower potential functions as a substantial light receiving section.

(b) to (g) in FIG. 8 show potentials of the pixels at times t1 to t6 and accumulated charge amounts in the pixels, respectively. At time t1, transfer voltages P1, P2 are applied so that the potentials of the light receiving sections 1, 3, 5 become lower than those of the light receiving sections 2, 4, 6. At this time, as shown in (b) in FIG. 8, a charge is generated by photoelectric conversion and accumulated in the leftmost light receiving section 1. Simultaneously, as shown in graphs (a), (b) of FIG. 9, the position of the objective lens 32 and the image pickup focus position by the same start oscillation from position a as a starting point.

Next, at time t2, transfer voltages P1, P2 are applied so that the potentials of the light receiving sections 2, 4, 6 become lower than those of the light receiving sections 1, 3, 5. At this time, as shown in (c) in FIG. 8, the charge that has been in the light receiving section 1 is transferred to the light receiving section 2, and a charge is further generated by photoelectric conversion and accumulated in the light receiving section 2. Further, at this point in time, the image pickup focus position by the objective lens 32 has moved to position b. Therefore, image data due to the charge accumulated in the light receiving section 1 at time t1 and image data due to the charge accumulated in the light receiving section 2 at time t2 are different in the focus position in the sample S.

Similarly, as shown in (d) to (g) in FIG. 8, at times t3, t4, t5, t6, the charge is transferred to the light receiving sections 3, 4, 5, 6, in order, and a charge is further generated by photoelectric conversion and accumulated in the respective light receiving sections. Further, at these points in time, the image pickup focus position by the objective lens 32 has moved to positions c, d, e, f. By the above operation, in the accumulated charge in the TDI driving CCD sensor of the image pickup device 20, image data with a focus extended is obtained for the whole of the oscillation width Zs (−Z~+Z) of the focus. Electrons that have reached the light receiving section 6 are output to the charge transfer section (refer to FIG. 2) functioning as a horizontal shift register, and read out as an image data signal to the outside via the charge transfer section.

Figure 10:
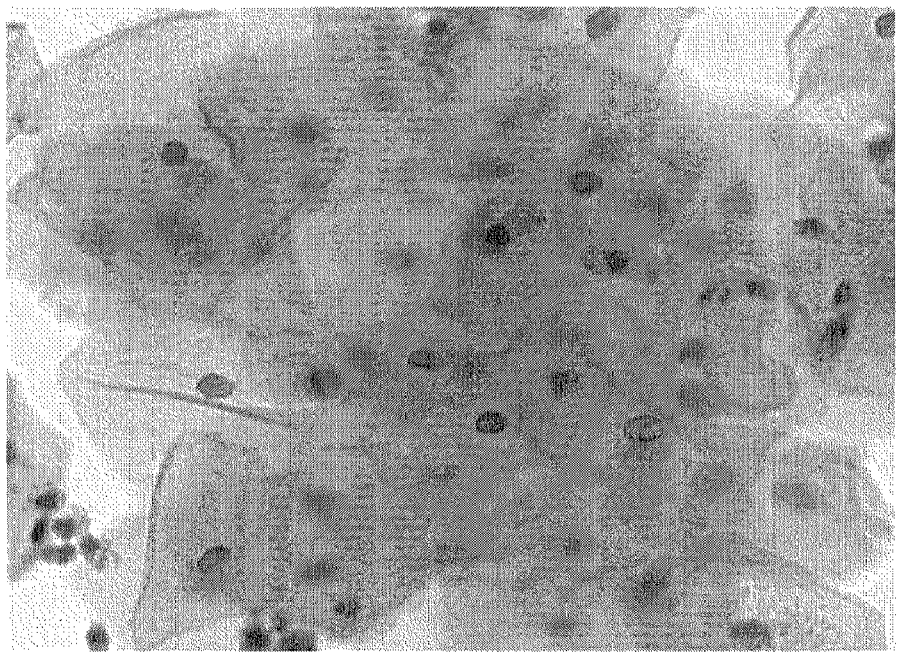
FIG. 10 is a view showing an example of a sample observation image acquired by the image acquisition apparatus.
Figure 11:
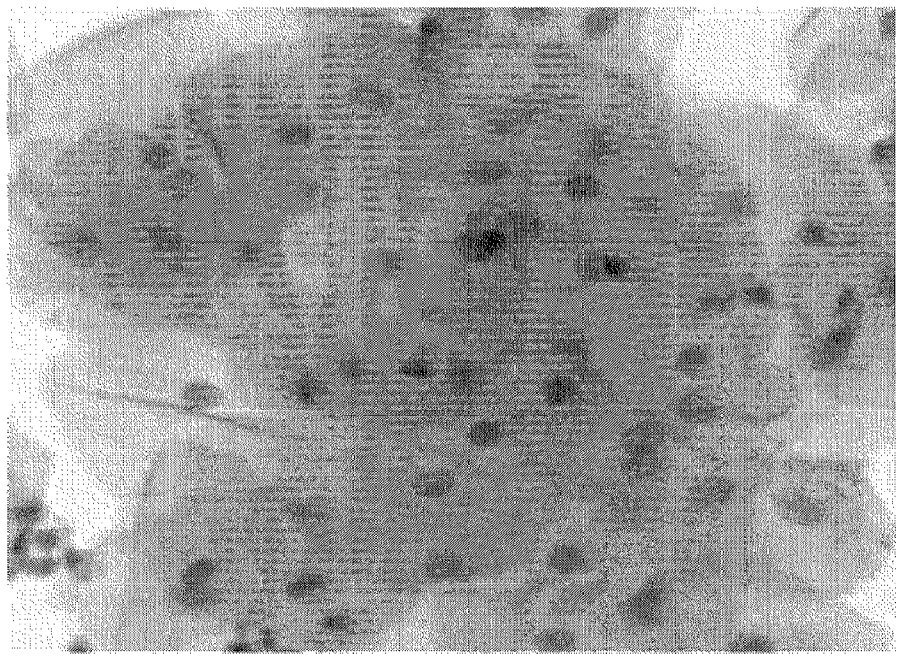
FIG. 11 is a view showing examples of a sample observation image acquired by the image acquisition apparatus.
Figure 11:
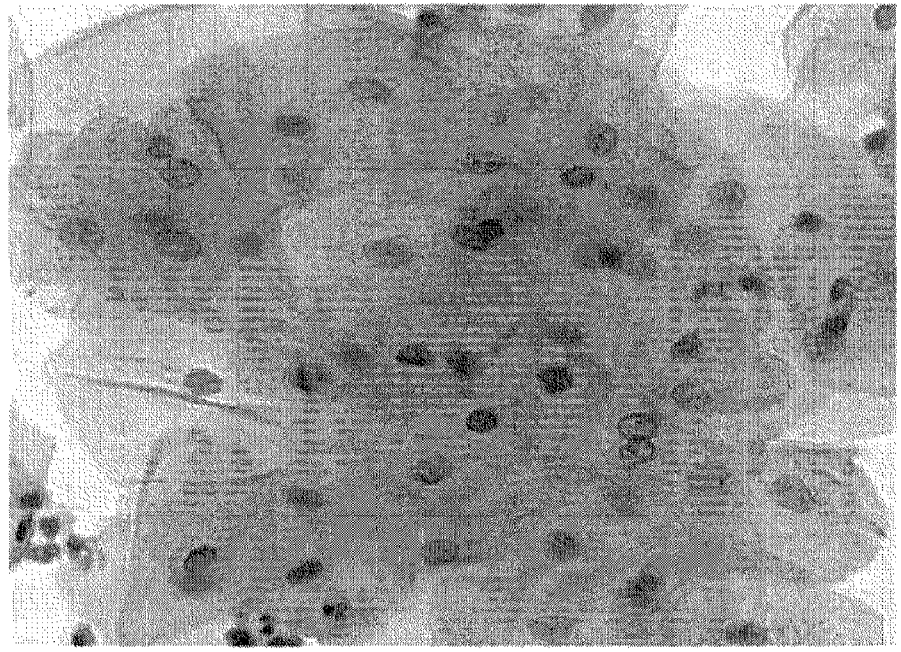

Examples of an observation image of the sample S acquired by using the image acquisition apparatus 1A according to the above-described embodiment will be described. FIG. 10 and FIG. 11 are views showing examples of an observation image of the sample S acquired by the image acquisition apparatus 1A, respectively. FIG. 10 shows an observation image without focus extension acquired with no focus oscillation control applied. In this image, depending on the position in the depth direction in the sample S, parts that are in focus and parts that are out of focus exist.

On the other hand, (a) in FIG. 11 shows an observation image with focus extension acquired with the foregoing focus oscillation control applied. This image as a whole is in focus as compared with the image of FIG. 10, so that it can be understood that the depth of focus is extended. Further, (b) in FIG. 11 shows a result of an image correction process for elimination of a blur component further performed for the extended focus image of (a) in FIG. 11. This image as a whole is in focus in terms of the depth direction, and shows an acquired image with high contrast.

Figure 12:
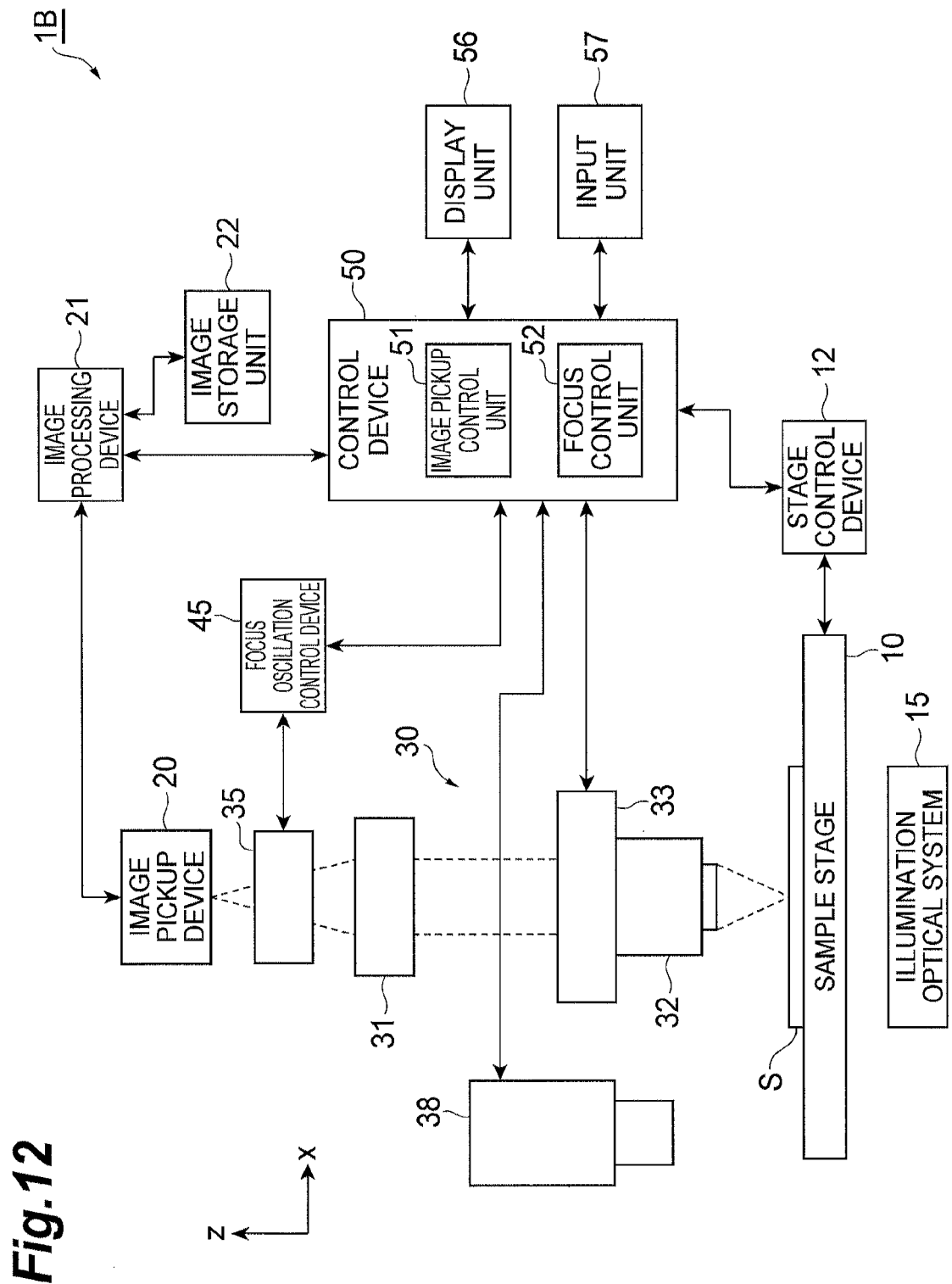
FIG. 12 is a block diagram showing a configuration of another embodiment of an image acquisition apparatus.

FIG. 12 is a block diagram showing a configuration of another embodiment of an image acquisition apparatus according to the present invention. The configuration of the image acquisition apparatus 1B according to this embodiment is basically the same as that of the image acquisition apparatus 1A shown in FIG. 1, but the configuration for oscillating the focus of image pickup in the sample S is different from that of the image acquisition apparatus 1A. That is, in the image acquisition apparatus 1B shown in FIG. 12, in the image pickup optical system 30, a liquid lens 35 is inserted on the optical axis between the image pickup device 20 and the tube lens 31. Further, for this liquid lens 35, a focus oscillation control device 45 is provided.

With regard to the configuration for oscillating the focus with respect to the sample S, a configuration for oscillating the focus F in the sample S by, as shown in the configuration example of FIG. 12, providing the liquid lens 35 in the image pickup optical system 30, and the focus oscillation control device 45 optically varying the focus condition in the liquid lens 35 to change the focus position of the sample S to be projected onto the TDI driving CCD sensor of the image pickup device 20, can also be used.

In this configuration, focus oscillation can be realized without physically oscillating the optical elements including the objective lens 32. However, in the configuration thus using the liquid lens 35, the magnification ratio of an image also varies due to focus oscillation control, and thus careful setting of an oscillation range of the focus is required. Further, focus oscillation control can also be performed by use of, for example, a deformable mirror, in addition to the liquid lens 35.

The image acquisition apparatus according to the present invention is not limited to the embodiments and configuration examples described above, and can be variously modified. For example, with regard to scanning of the sample S, the configuration for performing scanning using the sample stage 10 as an XY stage is exemplified in the above-described embodiments, but scanning of the sample S may performed by driving the image pickup device 20 and the image pickup optical system 30 within the xy plane, with the stage 10 fixed within the xy plane. With regard to the image pickup device 20 for acquiring an observation image of the sample S, an image pickup device capable of color imaging, for example, an image pickup device (refer to Patent Document 2: Japanese Patent Application Laid-Open No. 2008-51773) using a 3-chip CCD may be used.

With respect to the specific configurations of the image pickup device 20, the image pickup optical system 30, the sample stage 10, etc., various configurations may be used in addition to the configuration examples described above. In the configuration examples of FIG. 1 and FIG. 12, the configuration of a transmission type microscope apparatus using the illumination optical system 15 below the sample stage 10 is exemplified, but as a microscope optical system, without limitation to such a transmitting illumination optical system, for example, a reflecting illumination optical system, an epifluorescence optical system, or the like may be used. The control device 50 that controls the operations of respective apparatus parts may not be provided when the operations of those are manually controlled.

An image acquisition apparatus according to the above-described embodiment includes (1) a sample stage for carrying a sample as an image pickup object to be placed thereon, (2) an image pickup device capable of acquiring a two-dimensional image whose longitudinal direction is along a first direction and TDI operation, (3) an image pickup optical system including an objective lens disposed between the sample stage and the image pickup device, (4) scanning means for acquiring an observation image by the image pickup device and the image pickup optical system while scanning the sample in a second direction different from the first direction, and (5) focus oscillation control means for controlling oscillation of a focus in the sample so that the focus of image pickup in the sample to be set by the image pickup optical system oscillates at a predetermined oscillation frequency fs in an optical axis direction with respect to the sample, in which (6) the focus oscillation control means sets the oscillation frequency fs, with respect to an image pickup period Ti that is determined by a charge transfer rate and the number of transfer pixels in TDI operation in the image pickup device, so that the oscillation frequency fs coincides within a predetermined range with Ns times (where Ns is an integer of 1 or more) the basic frequency, which is a reciprocal 1/Ti of the image pickup period.

In the image acquisition apparatus with the above-described configuration, with regard to synchronization between TDI driving and focus oscillation, it is preferable that the focus oscillation control means sets the oscillation frequency fs so that, with an oscillation period of the focus provided as Ts, an oscillation count of the focus with respect to the image pickup period Ti provided as Ns, an oscillation width of the focus in the optical axis direction provided as Zs, and a width of depth of focus provided as 2D, an oscillation total period Ns×Ts with the whole of the oscillation count Ns coincides with the image pickup period Ti within a range of an allowable period deviation $\Delta Ts$ satisfying the following expression:

$$\Delta Ts/Ts = D/2Zs.$$

With this configuration, an observation image of the sample with a focus extended can be suitably acquired for the whole of the oscillation width Zs of the focus.

Alternatively, it is preferable that the focus oscillation control means sets the oscillation frequency fs so that, with a wavelength of light provided as λ, a numerical aperture of the objective lens provided as NA, a refractive index of a medium between the objective lens and the sample provided as n, an oscillation period of the focus provided as Ts, an oscillation count of the focus with respect to the image pickup period Ti provided as Ns, and an oscillation width of the focus in the optical axis direction provided as Zs, an oscillation total period Ns×Ts with the whole of the oscillation count Ns coincides with the image pickup period Ti within a range of an allowable period deviation ΔTs satisfying the following expression:

$$\Delta Ts/Ts = n\lambda/4Zs(NA)^2.$$

Also with this configuration, an observation image of the sample with a focus extended can be suitably acquired for the whole of the oscillation width Zs of the focus.

Alternatively, the focus oscillation control means may set the oscillation frequency fs so that the oscillation frequency fs coincides with Ns times the basic frequency. In this case, TDI driving in the image pickup device and focus oscillation can be completely synchronized with each other to acquire an observation image of the sample with a focus extended at high accuracy and reliably for the whole of the oscillation width Zs of the focus.

With regard to a configuration for oscillating a focus with respect to a sample, specifically, a configuration of the focus oscillation control means oscillating the focus in the sample by varying a position of the objective lens or a position of the sample stage in the optical axis direction can be used. Alternatively, a configuration of the image pickup optical system including a liquid lens placed on the optical axis, and the focus oscillation control means oscillating the focus in the sample by varying a focus condition in the liquid lens can be used.

The image acquisition apparatus may include a control device including image pickup control means for controlling an image pickup operation for the sample by TDI driving in the image pickup device and focus control means for controlling a focus oscillation operation by the focus oscillation control means. By providing such a control device, the operation of the image acquisition apparatus including synchronization between TDI driving and focus oscillation can be suitably realized.

In this case, it is preferable that the focus control means of the control device controls the focus oscillation operation by the focus oscillation control means based on whether to use focus oscillation and a focus oscillation condition specified in the control device. In this case, with regard to whether to use focus oscillation and a focus oscillation condition, a configuration for specifying these according to an input content through input means connected to the control device can be used. Alternatively, a configuration for specifying the conditions by automatic processing in the control device may be used.

INDUSTRIAL APPLICABILITY

The present invention can be used as an image acquisition apparatus capable of efficiently acquiring an observation image with a focus extended in a configuration for scanning a sample by an image pickup device.

REFERENCE SIGNS LIST 1A, 1B—image acquisition apparatus, S—sample (image pickup object), 10—sample stage, 12—stage control device, 15—illumination optical system, 20—image pickup device, 21—image processing device, 22—image storage unit, 25—CCD sensor, 26—photodetection section, 27—pixel, 28—charge transfer section, 30—image pickup optical system, 31—tube lens, 32—objective lens, 33—focus adjusting mechanism, 35—liquid lens, 38—macro image pickup device, 40, 45—focus oscillation control device, 50—control device, 51—image pickup control unit, 52—focus control unit, 56—display unit, 57—input unit.

The invention claimed is:

1. An image acquisition apparatus comprising:
a sample stage for placing a sample as an image pickup object thereon;
an image pickup device capable of acquiring a two-dimensional image whose longitudinal direction is along a first direction and TDI driving;
an image pickup optical system including an objective lens disposed between the sample stage and the image pickup device;
a scanner for acquiring an observation image by the image pickup device and the image pickup optical system while scanning the sample in a second direction different from the first direction; and
focus oscillation controller for controlling oscillation of a focus in the sample so that the image pickup focus in the sample to be set by the image pickup optical system oscillates at a predetermined oscillation frequency fs in an optical axis direction with respect to the sample, wherein
the focus oscillation controller sets the oscillation frequency fs, with respect to an image pickup period Ti that is determined by a charge transfer rate and the number of transfer pixels in TDI driving in the image pickup device, so that the oscillation frequency fs coincides within a predetermined range with Ns times (Ns is an integer not less than 1) the basic frequency, the basic frequency being a reciprocal 1/Ti of the image pickup period.

2. The image acquisition apparatus according to claim 1, wherein the focus oscillation controller sets the oscillation frequency fs so that, with an oscillation period of the focus provided as Ts, an oscillation count of the focus for the image pickup period Ti provided as Ns, an oscillation width of the focus in the optical axis direction provided as Zs, and a width of depth of focus provided as 2D, an oscillation total period Ns×Ts with the whole of the oscillation count Ns coincides with the image pickup period Ti within a range of an allowable period deviation ΔTs satisfying the following expression:

$$\Delta Ts/Ts = D/2Zs.$$

3. The image acquisition apparatus according to claim 1, wherein the focus oscillation controller sets the oscillation frequency fs so that, with a wavelength of light provided as λ, a numerical aperture of the objective lens provided as NA, a refractive index of a medium between the objective lens and the sample provided as n, an oscillation period of the focus provided as Ts, an oscillation count of the focus for the image pickup period Ti provided as Ns, and an oscillation width of the focus in the optical axis direction provided as Zs, an oscillation total period Ns×Ts with the whole of the oscillation count Ns coincides with the image pickup period Ti within a range of an allowable period deviation ΔTs satisfying the following expression:

$$\Delta Ts/Ts = n\lambda/4Zs(NA)^2.$$

4. The image acquisition apparatus according to claim 1, wherein the focus oscillation controller sets the oscillation frequency fs so that the oscillation frequency fs coincides with Ns times the basic frequency.

5. The image acquisition apparatus according to claim 1, wherein the focus oscillation controller oscillates the focus in the sample by varying a position of the objective lens or a position of the sample stage in the optical axis direction.

6. The image acquisition apparatus according to claim 1, wherein the image pickup optical system includes a liquid lens placed on the optical axis, and the focus oscillation controller oscillates the focus in the sample by varying a focus condition in the liquid lens.

7. The image acquisition apparatus according to claim 1, comprising a control device including image pickup controller for controlling an image pickup operation of the sample by TDI driving in the image pickup device and focus controller for controlling a focus oscillation operation by the focus oscillation controller.

8. The image acquisition apparatus according to claim 7, wherein the focus controller controls the focus oscillation operation by the focus oscillation controller, and wherein the control of the focus oscillation operation is performed based on user input.

* * * * *